United States Patent
Hsu et al.

(10) Patent No.: US 8,140,877 B2
(45) Date of Patent: *Mar. 20, 2012

(54) REDUCING POWER CONSUMPTION IN A SYSTEM OPERATING IN A POWER SAVING MODE

(75) Inventors: Hong-Kai Hsu, Taipei Hsien (TW); Ching-An Chung, Miaoli County (TW)

(73) Assignee: Mediatek Inc., Hsin-Chu (TW)

( * ) Notice: Subject to any disclaimer, the term of this patent is extended or adjusted under 35 U.S.C. 154(b) by 301 days.

This patent is subject to a terminal disclaimer.

(21) Appl. No.: 12/503,947

(22) Filed: Jul. 16, 2009

(65) Prior Publication Data

US 2009/0275369 A1 Nov. 5, 2009

Related U.S. Application Data

(63) Continuation of application No. 11/534,229, filed on Sep. 22, 2006, now Pat. No. 7,584,372.

(60) Provisional application No. 60/745,527, filed on Apr. 25, 2006.

(51) Int. Cl.
*G06F 1/32* (2006.01)
*G06F 1/00* (2006.01)
*H04B 1/38* (2006.01)

(52) U.S. Cl. ............ 713/320; 713/300; 455/574
(58) Field of Classification Search .......... 713/300, 713/320, 323
See application file for complete search history.

(56) References Cited

U.S. PATENT DOCUMENTS

| | | | |
|---|---|---|---|
| 5,649,314 A | 7/1997 | Yamada | |
| 6,084,483 A | 7/2000 | Keshtbod | |
| 6,545,529 B2 | 4/2003 | Kim | |
| 6,806,693 B1 | 10/2004 | Bron | |
| 7,167,190 B2 * | 1/2007 | Ito et al. | 345/690 |
| 7,205,989 B2 * | 4/2007 | Nakajima | 345/211 |
| 7,256,505 B2 | 8/2007 | Arms et al. | |
| 7,428,391 B2 * | 9/2008 | Kobayashi | 399/88 |
| 7,519,840 B2 * | 4/2009 | Lim et al. | 713/300 |

* cited by examiner

Primary Examiner — Suresh Suryawanshi
(74) Attorney, Agent, or Firm — Thomas|Kayden

(57) ABSTRACT

An apparatus is provided, for reducing power consumption in a system operating in a power saving mode, comprising a controller, an oscillator circuit and a voltage regulator. The controller provides a first control signal and a second control signal. The oscillator circuit, connected to the controller, wherein the controller controls the oscillator circuit according to the second control signal. The voltage regulator providing electric power to the oscillator circuit, connected to the controller, wherein the controller controls the voltage regulator according to the first control signal.

19 Claims, 6 Drawing Sheets

REDUCING POWER CONSUMPTION IN A SYSTEM OPERATING IN A POWER SAVING MODE

CROSS REFERENCE TO RELATED APPLICATIONS

This application is a Continuation of U.S. patent application Ser. No. 11/534,229, filed Sep. 22, 2006, now U.S. Pat. No. 7,584,372, which claims the benefit of U.S. provisional Application No. 60/745,527, filed Apr. 25, 2006, the entirety of which are incorporated by reference herein.

BACKGROUND

The invention relates to a wireless local area network (WLAN), and more particularly, to a power saving method for a station in the WLAN.

This section is intended to introduce the reader to various aspects of the art, which may be related to various aspects of the invention, which are described and/or claimed below. This discussion is believed to be helpful in providing the reader with background information to facilitate a better understanding of the various aspects of the invention. Accordingly, it should be understood that these statements are to be read in this light, and not as admissions of related art.

For a WLAN station operating in a power saving mode, when no packet is received or transmitted (hereinafter referred to as a sleep period), components of the WLAN station are turned off to reduce current consumption. In order to receive a scheduled packet, components of the WLAN station are wakening up before the scheduled packet arrives. For example, during a sleep period, most components, except a control IC, of the WLAN station are turned off to reduce current consumption. In order to receive a scheduled packet, a voltage regulator and an oscillator circuit of the WLAN station are wakening up before the scheduled packet arrives.

FIG. 1 illustrates a schematic diagram of part of a conventional WLAN station. As shown in FIG. 1, in the WLAN station, a control IC 10 comprises one single enable pin 101 to simultaneously control both a LDO (low dropout) regulator 15 and an oscillator circuit (OSC) 17, where the LDO 15 supplies power to the OSC 17. For improving power efficiency, during the period where there is no data transmission to or from the WLAN station, the WLAN station will shut down almost every components and switch to a power saving mode. When the WLAN station operates in the power saving mode, control IC 10 will disable both the LDO 15 and the OSC 17, but keep itself idle in a sleep mode. On the other hand, when data transmission is initiated, control IC 10 will enable both the LDO 15 and the OSC 17 and keep itself back to an active mode. In the power saving mode, by disabling the LDO regulator 15, possible current leakage may be prevented, resulting in less power loss. However, disabling the OSC 17 in the power saving mode might worsen the power consumption. This is because, while switching back to the active mode, as the OSC 17 is enabled after the LDO 15 is enabled and starts to supply power to OSC 17, it takes lots of time for the oscillator circuit (OSC) 17 to achieve stable operation where possible abnormal high current consumption may occur thereby. More time it takes, more current and power it wastes. In addition, a radio frequency (RF) circuit (not shown) may require being re-programmed, and additional current consumption may be incurred. As a result, the conventional circuit design as shown in FIG. 1 is not good enough.

FIG. 2 illustrates a schematic diagram of part of a conventional WLAN station. Similar to the circuit shown in FIG. 1, control IC 20 comprises one single enable pin 201. Here, the LDO 25 is however not controlled by Control ID 20, instead, it is always enabled. When the WLAN station operates in the power saving mode, control IC 20 will disable the OSC 27 and keep itself idle in the sleep mode. And, when data transmission is initiated, control IC 20 will enable the OSC 27 and switch itself back to the active mode. In this design, because the LDO 25 is enabled during the sleep period, current leakage might be incurred thereby. But, since the LDO 25 never stop supplying power to the OSC 27 so as to keep it power on, a relatively short time required for the oscillator circuit 27 to achieve stable operation, and abnormal high current consumption can thus be avoided.

For a long sleep period, mechanism of FIG. 1 is better than the mechanism of FIG. 2 for its low current leakage. For a short sleep period, however, mechanism of FIG. 2 is better than the mechanism of FIG. 1 for it requiring a short stable time.

SUMMARY

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

The present invention provides an apparatus for reducing power consumption in a system operating in a power saving mode, comprising a controller, an oscillator circuit and a voltage regulator. The controller provides a first control signal and a second control signal. The oscillator circuit, connected to the controller, wherein the controller controls the oscillator circuit according to the second control signal. The voltage regulator providing electric power to the oscillator circuit, connected to the controller, wherein the controller controls the voltage regulator according to the first control signal.

BRIEF DESCRIPTION OF DRAWINGS

The invention can be more fully understood by reading the subsequent detailed description and examples with references made to the accompanying drawings, wherein.

DETAILED DESCRIPTION

One or more specific embodiments of the invention are described below. In an effort to provide a concise description of these embodiments, not all features of an actual implementation are described in the specification. It should be appreciated that in the development of any such actual implementation, as in any engineering or design project, numerous implementation-specific decisions must be made to achieve developer specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The invention is now described with reference to FIG. 3 through FIG. 6, which generally relate to operation of a station in a wireless local area network (WLAN). In the following detailed description, reference is made to the accompanying drawings which form a part hereof, shown by way of illustration of specific embodiments. These embodiments are described in sufficient detail to enable those skilled in the art to practice the invention, and it is to be understood that other embodiments may be utilized and that structural, logical and electrical changes may be made without departing from the spirit and scope of the invention. The following detailed description is, therefore, not to be taken in a limiting sense. The leading digit(s) of reference numbers appearing in the figures correspond to the Figure number, with the exception that the same reference number is used throughout to refer to an identical component which appears in multiple figures. It should be understood that many of the elements described and illustrated throughout the specification are functional in nature and may be embodied in one or more physical entities or may take other forms beyond those described or depicted.

The invention can be implemented in a wireless communication system with power saving mechanism, such as wireless local area network power saving specified in the IEEE 802.11 standard.

Since the primary purpose of a WLAN is to provide service for mobile nodes, which typically rely on battery power, efficient utilization of transmission and reception power is an important consideration. The IEEE 802.11 standard specifies an optional power saving mode for stations. The stations operating in the power saving mode listen to beacon frames periodically broadcast from the access point. If the station is informed by the beacon frame that data packets are buffered at the access point, it will send trigger frame to the access point for the queued data packets. The station can be a GSM/WiFi dual mode mobile phone, a wireless hand-held device, or other systems operating in a power saving mode with various sleep periods.

Figure 1:
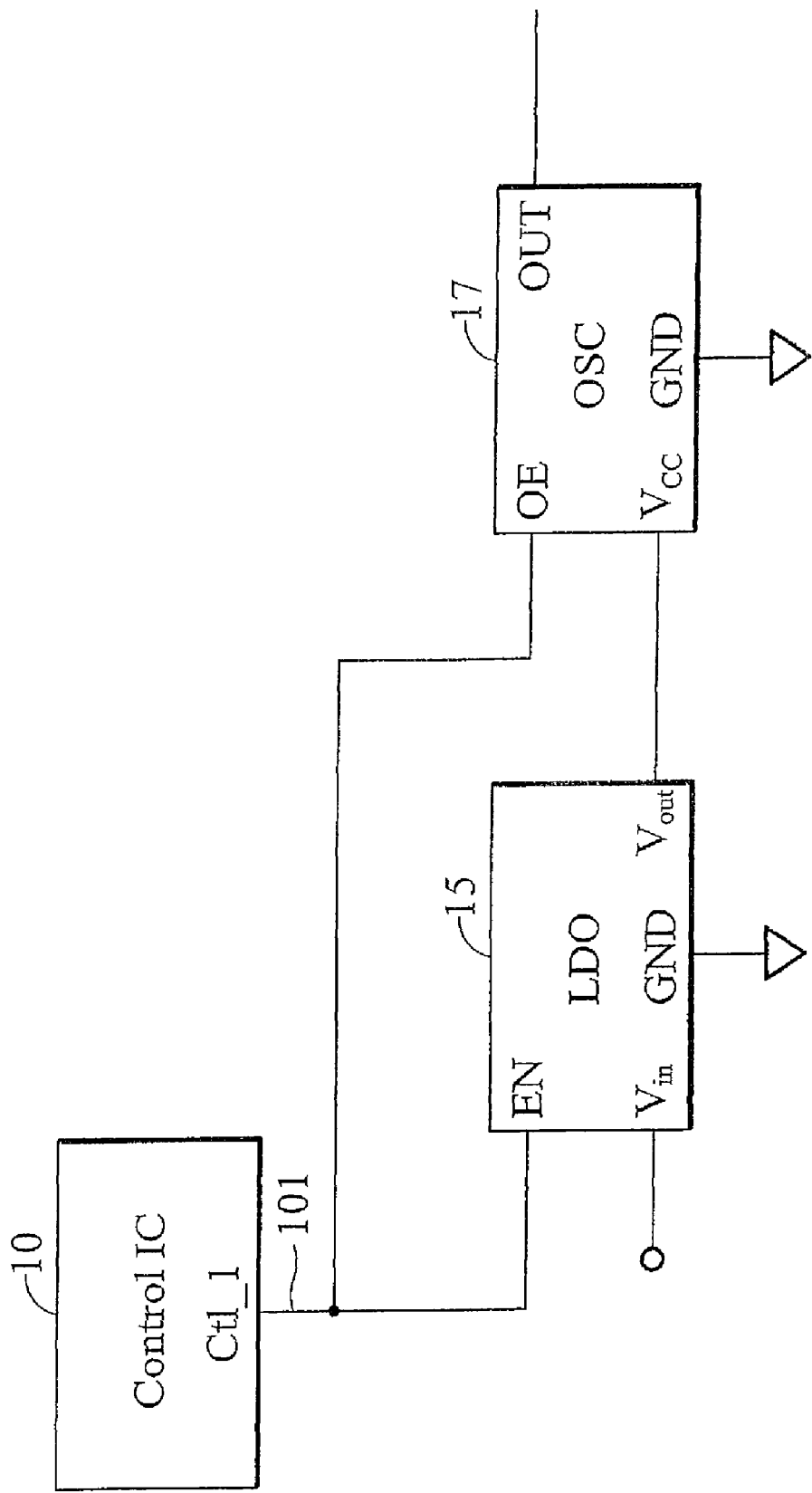
FIG. 1 illustrates a schematic diagram of oscillator and voltage regulator connection used in WLAN power save mode.
Figure 2:
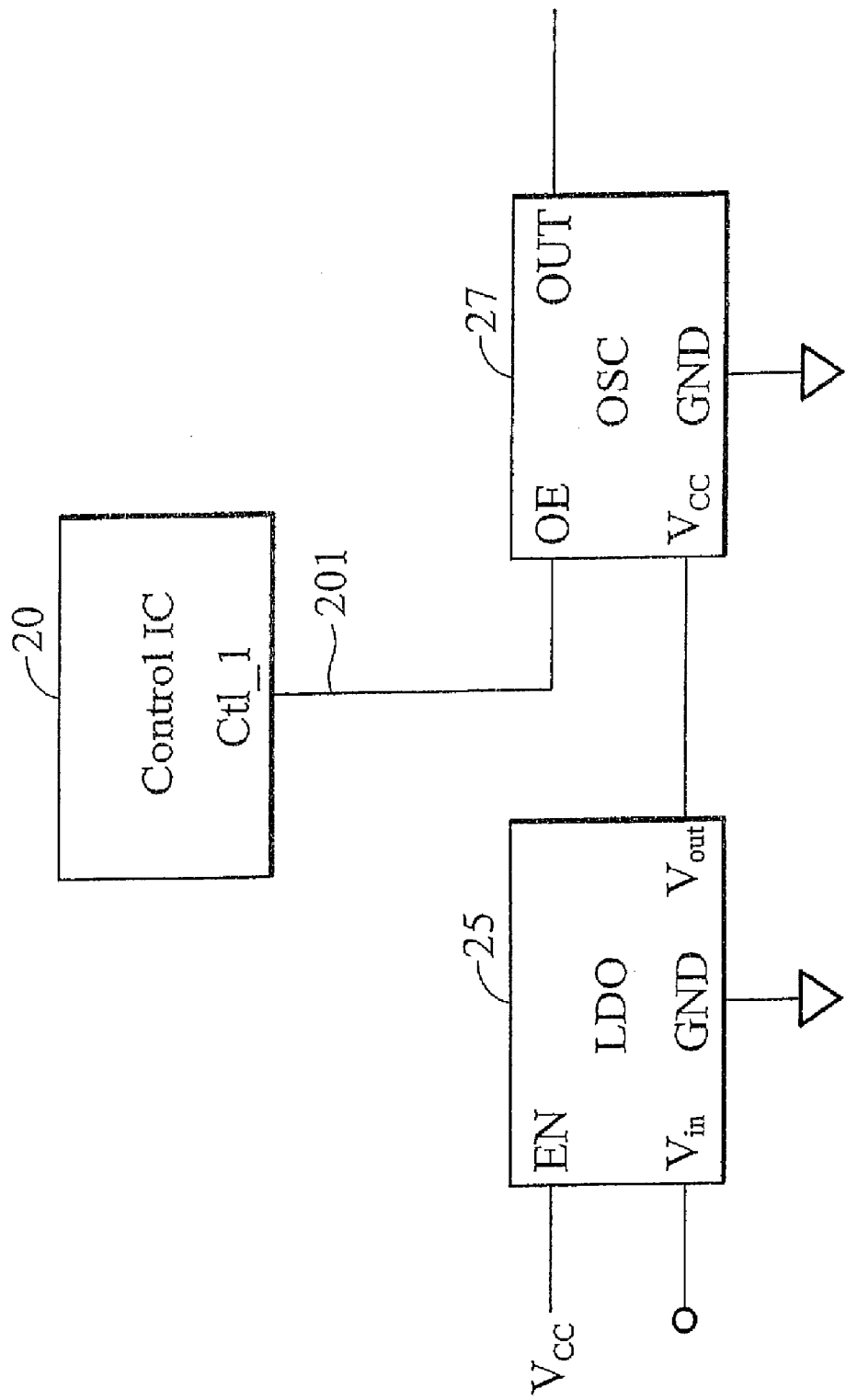
FIG. 2 illustrates a schematic diagram of oscillator and voltage regulator connection used in WLAN power save mode, too.
Figure 3:
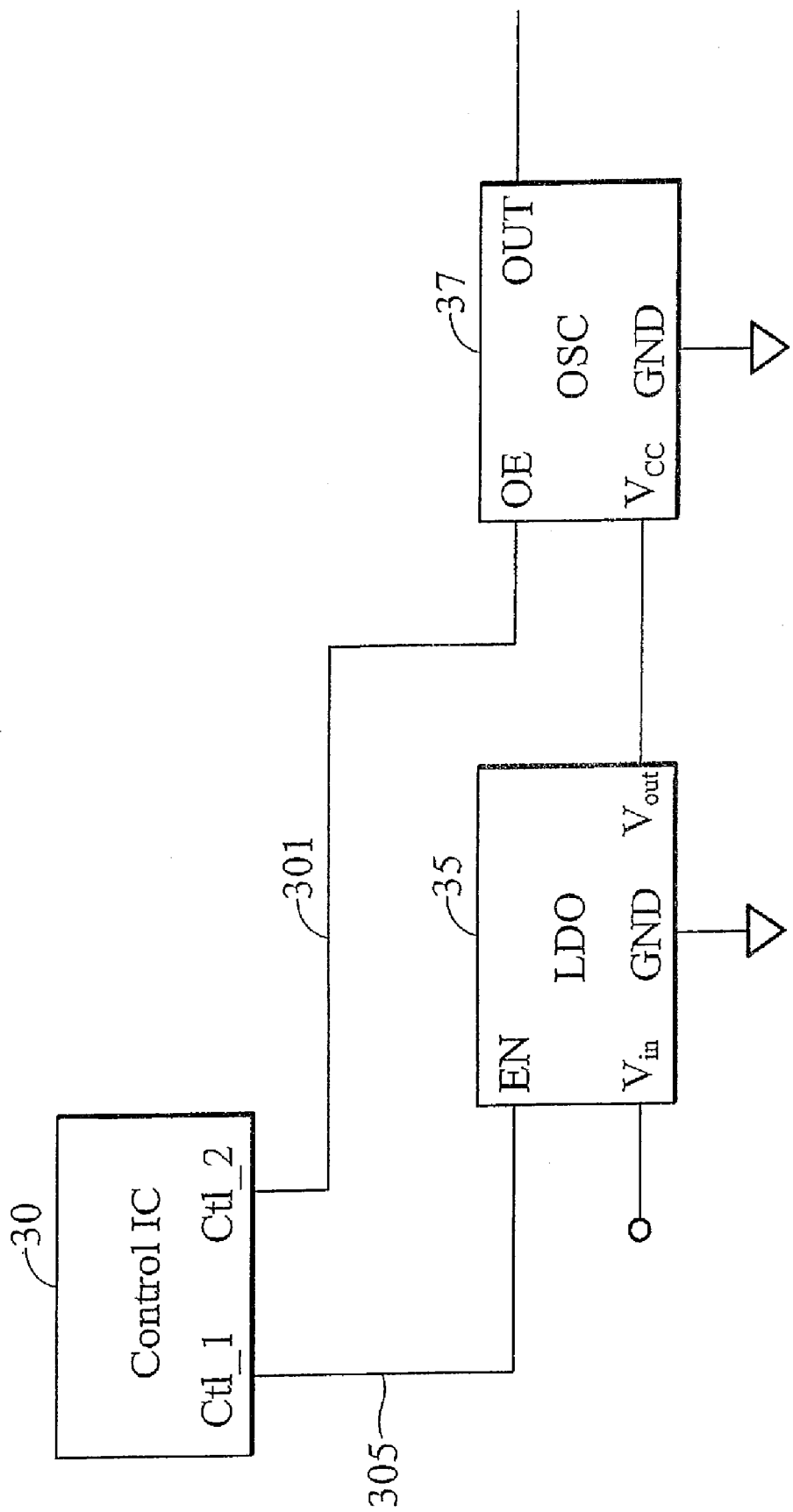
FIG. 3 illustrates a schematic diagram of an embodiment of an apparatus for reducing power consumption in a system operating in a power saving mode.

FIG. 3 illustrates a schematic diagram of an embodiment of an apparatus for reducing power consumption in a system operating in a power save mode. As shown in FIG. 3, in the WLAN station, a control IC 30 comprises two enable pins 301, 305 to simultaneously control both a LDO (low dropout) regulator 35 and an oscillator circuit (OSC) 37, where the LDO 35 supplies power to the OSC 37. For improving power efficiency, during the period where there is no data transmission to or from the WLAN station, the WLAN station will shut down almost every components and switch to the power saving mode. In the present invention, at least one of the components of a control IC 30 remains awaken when the WLAN station is operating in the power saving mode. In the power saving mode, the duration between two awakenings is referred to as a sleep period. In this embodiment of the present invention, the LDO 35 can either be disabled by pin 305 during the sleep period, or remains enabled during the sleep period. Similarly, the OSC 37 can be enabled or disabled by pin 301.

In the present invention, the control IC 30 respectively determines whether to enable or disable pin 305 and pin 301 according to an estimation of the total current consumption corresponding to different settings of pin 301 and pin 305. The possible setting could be disabling the pins 301 and 305 at the same time; enabling the pin 305 first and the pin 301 later after the power supply of the LDO 35 to the OSC 37 is stable; and keeping the pin 305 always enable and enabling the pin 301 only when leaving the sleep mode. The estimated total current consumption can be calculated according to a current leakage of the LDO 35, a stable time requirement of the OSC 37, a sleep time length of the system, and other pertaining factors.

For example, the control IC 30 calculates the total current consumption of the station corresponding to different settings of the pin 301 and pin 305, and one of the settings corresponding to the lowest total current consumption is selected, wherein the calculation is performed according to the following equation:

$$\text{sum}=A*x+B*y+C*z \qquad \text{(equation 1)}$$

where A corresponds to duration of power saving mode of the system, B corresponds to duration of stable time of the oscillator circuit, C corresponds to duration of stable time for other components of the system, x corresponds to current consumption of the system in a power saving mode, y corresponds to current consumption of stable duration of the oscillator circuit, and z corresponds to current consumption in stable duration of other components of the system.

Figure 4:
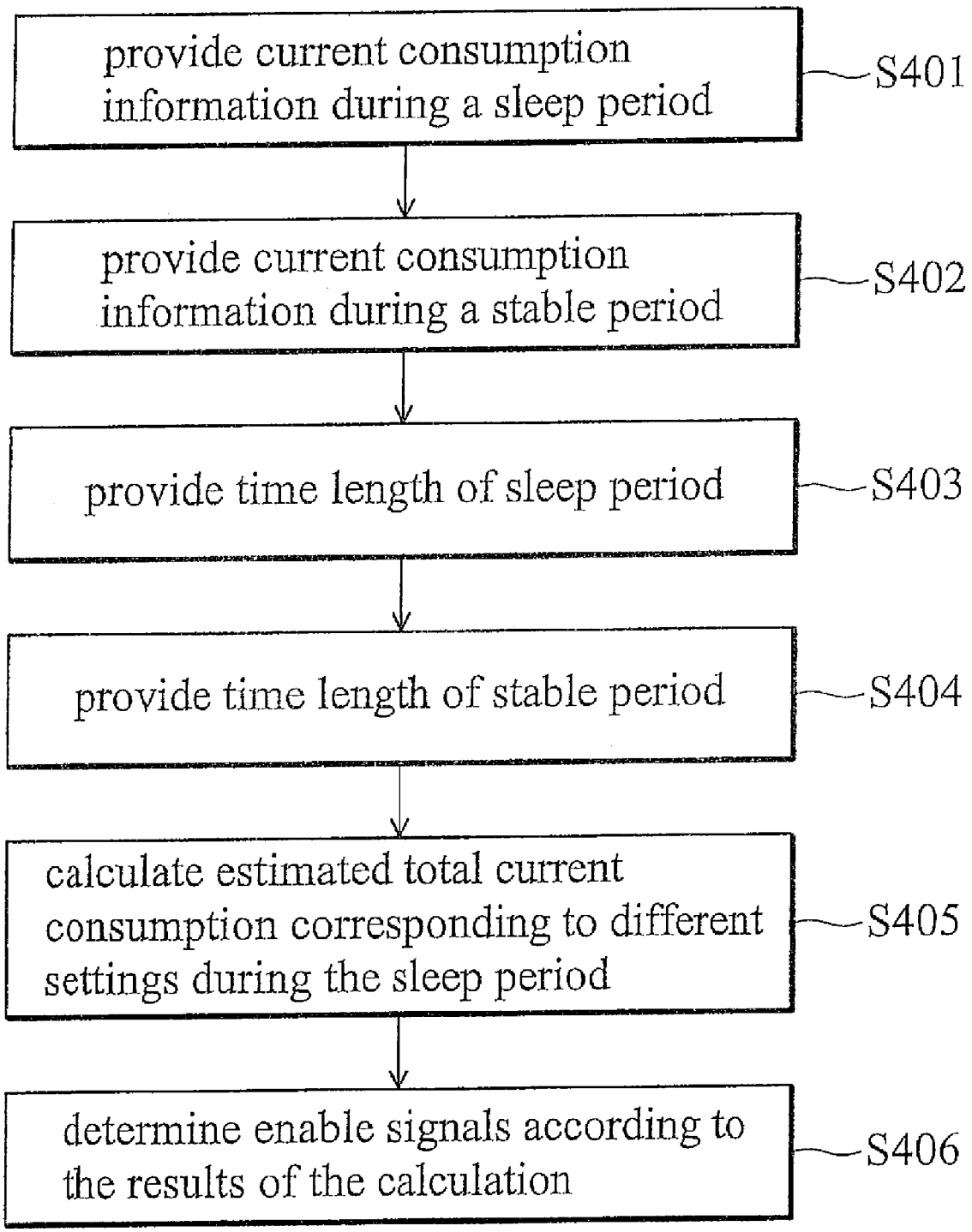
FIG. 4 is a flowchart of an embodiment of a method for reducing power consumption in a system operating in a power saving mode.

FIG. 4 is a flowchart of an embodiment of a method for reducing power consumption in a system operating in a power saving mode. The method of FIG. 4 can be implemented in the station of FIG. 3. In step S401, information pertaining to current consumption of components of the station during a sleep period is provided. In step S402, information pertaining to current consumption of components, such as oscillator circuit 37 and other components, during a stable period is provided. Here, the time required by a component to reach stable operation from doze state is referred to as a stable period. Generally, current consumption of a particular component during the stable period is greater than the current consumption of the component during sleep period. In addition, the current consumption for a disabled LDO regulator to be stable is greater than an enabled LDO regulator. In step S403, time length of the sleep period is provided. In step S404, information pertaining to time length of stable period of the oscillator circuit and other components of the station is provided.

In step S405, estimated total current consumption is calculated corresponding to different settings of the LDO regulator during the sleep period. In other words, the current consumption when the LDO regulator is enabled during the sleep period, and when the LDO regulator is disabled during the sleep period is calculated respectively. The calculation is performed according to the following equation:

$$\text{Total current consumption}=A*x+B*y+C*z \qquad \text{(equation 1)}$$

where A corresponds to duration of power saving mode of the system, B corresponds to duration of stable time of the oscillator circuit, C is the duration of normal operation, x corresponds to current consumption of the system in a power saving mode, y corresponds to current consumption of stable duration of the oscillator circuit, and z corresponds to current consumption in normal operation.

If the current consumption is lower when the LDO regulator is disabled during the sleep period, a time lag between the wakening time of the LDO regulator and the oscillator circuit can be further determined. For example, the oscillator circuit can be enabled at the time when the LDO regulator reaches a stable operation status.

In step S406, the pin 301 and pin 305 are determined according to the results of the calculation of step S405, and the LDO regulator and the oscillator circuit are controlled accordingly.

Figure 5:
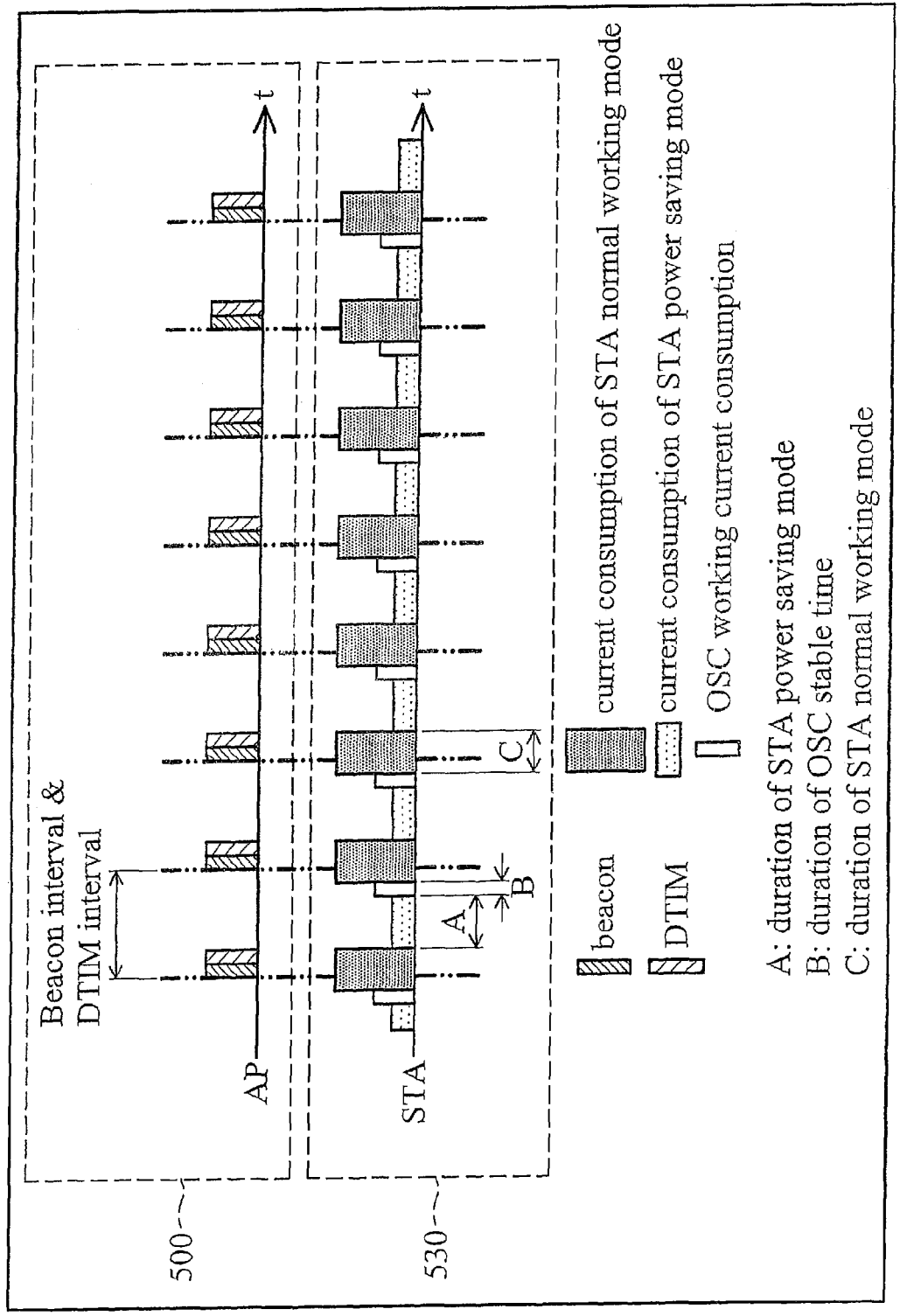
FIG. 5 illustrates an example for relatively short sleep period.
Figure 6:
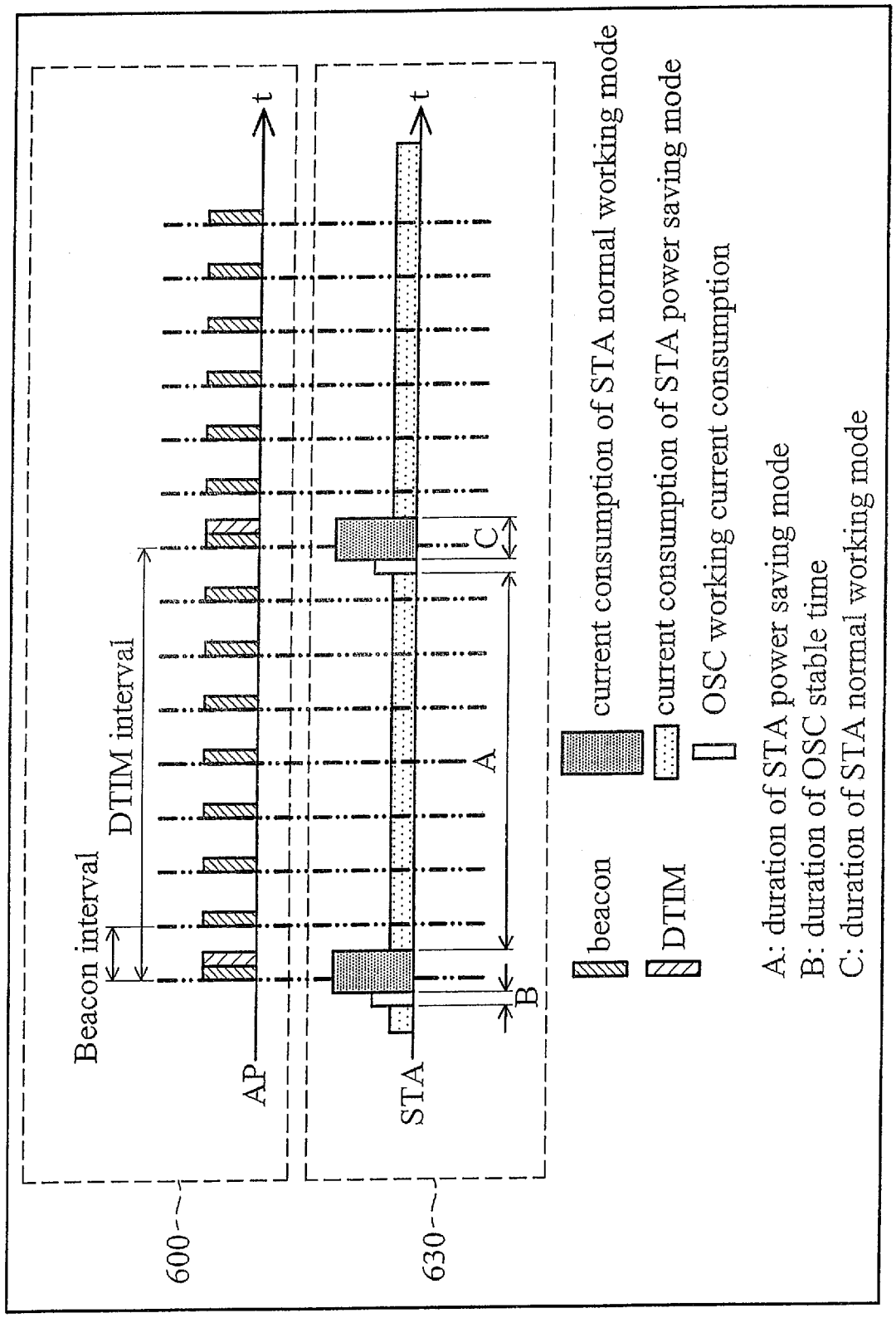
FIG. 6 illustrates an example for a relatively long sleep period.

Here, two examples are provided to illustrate operations of dynamic control of the LDO regulator and oscillator circuit during the sleep period to reduce current consumption of a station operating in a power saving mode as much as possible. FIG. 5 illustrates an example for relatively short sleep period; FIG. 6 illustrates an example for a relatively long sleep period.

FIG. 5 shows a schematic view of the operation of a power saving mode according to 802.11 WLAN. Block 500 depicts activities in an access point. In a power saving mode, the access point is responsible for generating beacon frames. A time interval between two beacon frames is referred to as a "beacon interval".

The AP shall transmit a TIM with every beacon, and for every DTIM period, a TIM of type "DTIM" is transmitted within a beacon. When the access point buffers broadcast or multicast frames, it shall transmit these buffered frames in DTIM. Thus stations needs to wakeup to receive the broadcast and multicast messages in DTIM. Here, the DTIM period is the same as beacon interval, as shown in FIG. 5.

Block 530 depicts current consumption corresponding to a station associated with the access point. In period A, with no incoming beacons, the station enters into the sleep period. In the sleep period, the station consumes minimum power during doze mode by turning off nearly every component. Station wakes up periodically (at the right time, which is depicted as a "normal mode") to receive regular beacon frames coming from the access point. Before the station enters the normal mode to listen beacon, an oscillator circuit should be turned on. In period B, the oscillator circuit is turned on. In period C, the station enters normal mode. The Blocks corresponding to periods A, B, and C illustrate current consumption in the corresponding periods, respectively.

Referring to FIG. 5, the beacon interval of the access point is 100 ms, DTIM interval is 1, and the station wakes up at every DTIM. Here, period A is 95 ms, period C is 5 ms, and a stable time of the oscillator circuit is 3 ms. For example, the current consumption of a LDO regulator to control oscillator circuit is 0.04 mA, and the current consumption of other components of the station is also 0.04 mA. In addition, a RF of the station requires a re-initiation if the LDO is disabled during the sleep period. The stable time of the RF is 700 us and average current consumption level is 13 mA. Here, estimated total current consumption is calculated corresponding to different settings of the LDO regulator during the sleep period. For example, the current consumption when the LDO regulator is enabled during the sleep period, and when the LDO regulator is disabled during the sleep period is calculated, respectively. The calculation is performed according to equation 1. When the LDO regulator is disabled during the sleep period, the total current consumption is calculated according to the following equation:

Total current consumption=95 ms*0.04 mA+3 ms*(0.04 mA+0.04 mA)+0.7 ms*13 mA=13.14 mAms When the LDO regulator is enabled during the sleep period, the total current consumption is calculated according to the following equation:

Total current consumption=(95 ms+3 ms)*(0.04 mA+0.04 mA)=7.84 mAms

According to results of the calculation, it would be more efficient in power consumption to keep the LDO regulator enabled during the sleep period, disable the oscillator circuit during the sleep period and enable the oscillator circuit to receive the beacon frame after the sleep period.

FIG. 6 shows a schematic view of the operation of a power saving mode according to 802.11 WLAN. Block 600 depicts activities in an access point. In a power saving mode, the access point is responsible for generating beacon frames. A time interval between two beacon frames is referred to as a "beacon interval".

The AP shall transmit a TIM with every beacon, and for every DTIM period, a TIM of type "DTIM" is transmitted within a beacon. When the access point buffers broadcast or multicast frames, it shall transmit these buffered frames in DTIM. Thus stations needs to wakeup to receive the broadcast and multicast messages in DTIM. Here, the DTIM period is eight times than the beacon interval, as shown in FIG. 6.

Block 630 depicts current consumption corresponding to a station associated with the access point. In period A, the station enters sleep period. The station consumes minimum power during doze mode by turning off nearly every component except for a timing circuit. Station wakes up periodically (at the right time, which is depicted as a "normal mode") to receive regular beacon frames coming from the access point. Before the station enters the normal mode to listen beacon, an oscillator circuit should be turned on. In period B, the oscillator circuit is turned on. In period C, the station enters normal mode. The Block areas corresponding to periods A, B, and C illustrate current consumption level in the corresponding periods, respectively.

Referring to FIG. 6, the beacon interval of the access point is 100 ms, DTIM interval is 8, and the station wakes up at every DTIM. Here, period A is 795 ms, period C is 5 ms, and a stable time of the oscillator circuit is 3 ms. For example, the current consumption of a LDO regulator to control oscillator circuit is 0.07 mA, and the current consumption of other components of the station is also 0.07 mA. In addition, the current consumption of the oscillator circuit when LDO regulator was disabled during the sleep period and then enabled after the sleep period can be further reduced by enabling the oscillator circuit at the time when the LDO regulator operates stably. In other words, the time lag between enablement of oscillator circuit and the LDO regulator can be the stable of the LDO regulator. Here, estimated total current consumption is calculated corresponding to different settings of the LDO regulator during the sleep period. For example, the current consumption when the LDO regulator is enabled during the sleep period, and when the LDO regulator is disabled during the sleep period is calculated, respectively. The calculation is performed according to equation 1.

When the LDO regulator is disabled during the sleep period, the total current consumption is calculated according to the following equation:

Total current consumption=795 ms*0.07 mA+3 ms*(0.07 mA+0.07 mA)=56.07 mAms

When the LDO regulator is enabled during the sleep period, the total current consumption is calculated according to the following equation:

Total current consumption=(795 ms+3 ms)*(0.07 mA+0.07 mA)=111.72 mAms

According to results of the calculation, it would be more efficient in power consumption to disable both the LDO regulator and the oscillator circuit during the sleep period. In addition, the current consumption of the oscillator circuit when LDO regulator was disabled during the sleep period and then enabled after the sleep period can be further reduced by enabling the oscillator circuit at the time when the LDO regulator operates stably. In other words, the time lag between enablement of oscillator circuit and the LDO regulator can be the stabling time of the LDO regulator.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus for reducing power consumption in a system operating in a power saving mode, comprising:
    a controller providing a first control signal and a second control signal;
    an oscillator circuit, connected to the controller, wherein the controller controls the oscillator circuit according to the second control signal; and
    a voltage regulator providing electric power to the oscillator circuit, connected to the controller, wherein the controller controls the voltage regulator according to the first control signal,
    wherein the controller provides the first control signal and the second control signal according to a sleep time period of the system.

2. The apparatus of claim 1, wherein the voltage regulator is a low dropout (LDO) regulator or a switching regulator.

3. The apparatus of claim 1, wherein the system implementing the apparatus is a GSM/WiFi dual mode mobile phone.

4. The apparatus of claim 1, wherein the system implementing the apparatus is a hand-held device.

5. The apparatus of claim 1, wherein the controller further calculates an estimated total current consumption of the system corresponding to different settings, wherein the calculation is performed according to the following equation:

the estimated total current consumption $= A*x + B*y + C*z$, wherein A is a duration of the power saving mode of the system, B is a duration of a stable time of the oscillator circuit, C is a duration of a normal mode, x is current consumption of the system in the power saving mode, y is current consumption of the duration of the stable time of the oscillator circuit, and z is current consumption of the duration in normal mode.

6. The apparatus of claim 5, wherein the controller further compares each estimated total current consumption corresponding to different settings to determine the lowest total current consumption, and selects the setting corresponding to the lowest total current consumption, wherein the controller determines the first control signal and the second control signal according to the selected setting.

7. The apparatus of claim 5, wherein the settings specify any of the following:
    (1) simultaneously, enabling the voltage regulator by the first control signal and enabling the oscillator circuit by the second control signal;
    (2) steadily enabling the voltage regulator by the first control signal, and enabling the oscillator circuit by the second control signal only when changing from the power saving mode to the normal mode; and
    (3) enabling the voltage regulator by the first control signal, and then, enabling the oscillator circuit by the second control signal after the stable time.

8. The apparatus of claim 1, wherein the controller is a control IC.

9. An apparatus for reducing power consumption in a system operating in a power saving mode, comprising:
    a controller providing a first control signal and a second control signal;
    an oscillator circuit, connected to the controller, wherein the controller controls the oscillator circuit according to the second control signal; and
    a voltage regulator providing electric power to the oscillator circuit, connected to the controller, wherein the controller controls the voltage regulator according to the first control signal;
    wherein the controller provides the first control signal and the second control signal according to a current leakage of the voltage regulator.

10. The apparatus of claim 9, wherein the voltage regulator is a low dropout (LDO) regulator or a switching regulator.

11. The apparatus of claim 9, wherein the system implementing the apparatus is a GSM/WiFi dual mode mobile phone.

12. The apparatus of claim 9, wherein the system implementing the apparatus is a hand-held device.

13. The apparatus of claim 9, wherein the controller is a control IC.

14. An apparatus for reducing power consumption in a system operating in a power saving mode, comprising:
    a controller providing a first control signal and a second control signal;
    an oscillator circuit, connected to the controller, wherein the controller controls the oscillator circuit according to the second control signal; and
    a voltage regulator providing electric power to the oscillator circuit, connected to the controller, wherein the controller controls the voltage regulator according to the first control signal;
    wherein the controller provides the first control signal and the second control signal according to a stable time of the oscillator circuit.

15. The apparatus of claim 14, wherein the voltage regulator is a low dropout (LDO) regulator or a switching regulator.

16. The apparatus of claim 14, wherein the system implementing the apparatus is a GSM/WiFi dual mode mobile phone.

17. The apparatus of claim 14, wherein the system implementing the apparatus is a hand-held device.

18. The apparatus of claim 14, wherein the controller is a control IC.

19. A method for reducing power consumption in a system operating in a power saving mode, wherein the system comprises an oscillator circuit and a voltage regulator, the method comprising:
    providing a sleep time period of the system;
    determining a first control signal and a second control signal according to the sleep time period of the system; and
    controlling the oscillator circuit and the voltage regular according to the determined first control signal and the determined second control signal.

* * * * *